Aug. 9, 1960    E. H. HULL    2,948,355
OIL MIST LUBRICATION APPARATUS AND SYSTEM
Filed Nov. 13, 1957
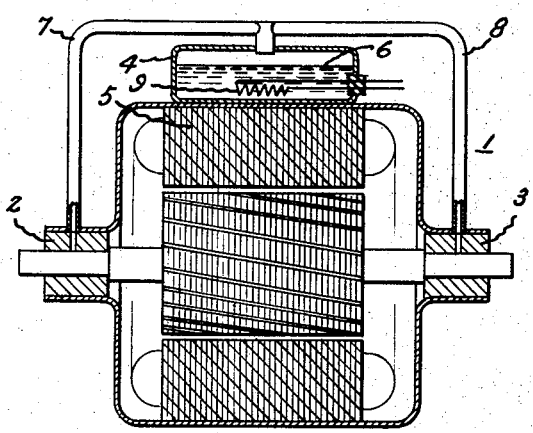
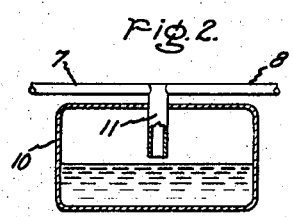
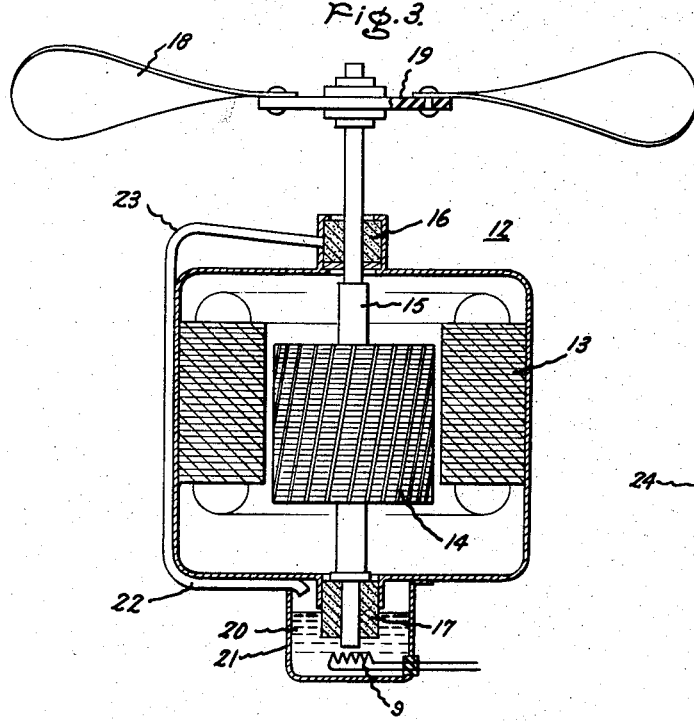
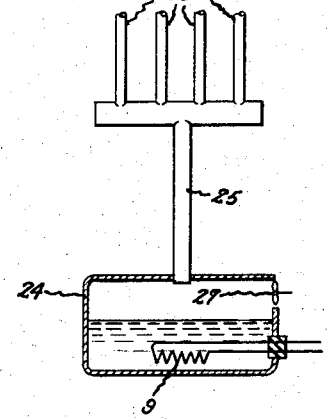
Inventor:
Edwin H. Hull,
by *Paul A. Frank*
His Attorney.

United States Patent Office 2,948,355
Patented Aug. 9, 1960

2,948,355
OIL MIST LUBRICATION APPARATUS AND SYSTEM

Edwin H. Hull, Scotia, N.Y., assignor to General Electric Company, a corporation of New York Filed Nov. 13, 1957, Ser. No. 696,126

3 Claims. (Cl. 184—6)

This invention relates to oil mist lubrication and, more particularly, to long-life lubrication systems employing a vaporization and condensation principle to transport or carry oil to surfaces requiring lubrication. The vapor phase of a lubricant as employed in this invention includes both the vapor and/or mist phase.

Lubrication is generally becoming increasingly problematical in many applications in spite of modern improvements and advances in this art. One particular field or area of lubrication which has undergone extensive study is long-life lubrication not requiring inspection of the system at regular and systematic intervals or continuously replenishing the lubricant supply. The well-known practice or partial solution to this problem is the use of pre-oiled or lubricant sealed bearings where such bearings are applicable, considering speeds, loads, temperatures, etc. The sealed bearing is quite well exemplified in the ball type of bearing where end caps are provided on opposite faces of the bearing to contain a suitable lubricant, generally grease. Where rotating machinery must operate for extensive periods of time such as for example ten or more years at half-time or greater operating periods, the lubricant of a sealed bearing becomes exhausted and mechanical problems of design generally restrict the supply or reservoir of grease available. On the other hand, ball bearings are not applicable where the machinery they serve is relatively inexpensive and mass-produced, due to the economic factors involved. One solution to these aforementioned problems would include a lubrication system having a lubricant supply or reservoir and means for delivering the lubricant to the bearing when necessary and in such quantities with relation to the supply so that no inspection or replenishment would be necessary for greatly extended periods of time. Additionally, such a system should be one of very low cost relative to the equipment it serves.

Accordingly, it is an object of this invention to provide an improved lubrication system.

It as a further object of this invention to provide a lubrication system employing vaporization and consequent condensation for transporting and lubrication.

It is still another object of this invention to provide a self-sustaining, long-life system.

It is a further object of this invention to provide a lubrication system utilizing heat obtainable from the servant apparatus to vaporize the lubricant.

It is still another object of this invention to provide a low cost lubrication system particularly applicable to light machinery.

Briefly described, this invention contemplates in its broader sense a lubrication system including means for heating a reservoir or supply of lubricant to provide a vapor or mist phase, and then transporting or otherwise delivering this vapor or mist to or adjacent the surface to be lubricated where it is condensed for liquid lubrication. In its restrictive sense, this invention contemplates a reservoir or supply of lubricant positioned adjacent to or within the apparatus to be served and deriving heat therefrom to vaporize the oil for surface lubrication.

These and other objects, features, and advantages of this invention will be better understood when taken in connection with the following description, and the drawings, in which:

Fig. 1 illustrates one form of this invention as applied to electric motors;

Fig. 2 discloses one type of reservoir which may be used with the lubrication system as disclosed in Fig. 1;

Fig. 3 discloses an improved form of this invention as applied to vertically positioned electric motors; and Fig. 4 illustrates a lubrication system incorporating the basic features of this invention.

Referring now to Fig. 1, there is shown an arrangement of an exemplary and simplified form of this invention. Fig. 1 represents a rotating apparatus such as an electric motor 1 having bearings 2 and 3 requiring proper lubrication. One practical application serving to clarify the various features of this invention is the small motor-driven fan. With the trend toward functional design in all modern machinery, including household appliances, the particular mechanisms or drive means have been relegated in some instances to relatively inaccessible locations which prove to be a deterrent to systematic inspection and lubrication. On the other hand, even where lubrication facilities in the mechanism are accessible, it has been found that improper lubrication or lack of lubrication is a constant and consistent problem. Other examples are equally applicable, such as cooling fans for refrigeration, or where very small motors drive equally small fans for air circulation within a refrigerator cabinet. It can be understood that in this particular exemplary application, the low cost of such a motor driven fan is prohibitive to an expensive lubrication system. The motor 1 of Fig. 1 may be effectually employed in the aforementioned application by incorporating the lubrication system of this invention. The lubricant reservoir 4 is shown as positioned adjacent the stator 5 of motor 1 and is made of metal or other good heat conducting material. The heat generated in the motor during operation is transferred in part to the supply of lubricant 6 to commence vaporization thereof. By means of suitable conduits 7 and 8, the vapor or mist from lubricant 6 is carried to the bearings 2 and 3. Depending on the temperature considerations involved, conduits 7 and 8 may be insulated to sustain the vapor phase or be uninsulated near the bearings to aid in the vapor condensation. For effective lubrication, this system operates upon a differential temperature where the temperature of the vaporized lubricant is higher than the temperature at the bearings 2 and 3 in order for the vapor to condense at the bearing. Such a temperature differential is usually found in most applications where either the bearings are purposefully cooled or are exposed to cooling conditions by their particular metallic structure. In fan motors especially, the bearings are usually exposed to the flow of air from the fan. More specifically, the temperature of the motor from which heat is to be derived predetermines the lubricant to be utilized since the lubricant must vaporize at a temperature less than the operating temperature of the motor or a part thereof.

Where the application requires appreciable running time in order to vaporize the oil, some provision is necessary to supply lubricant to the bearing for the interim time period. A reservoir or wick may be employed to accumulate a supply of oil at the bearing, or as in one preferred form of this invention, the bearing is of the well-known porous type and thus serves as its own reservoir to maintain a lubricant supply until a suitable temperature has been attained.

Several included modifications are apparent in this invention; for example, when the system is employed for low temperature apparatus, where the temperature rise is not sufficient to vaporize the oil, or to vaporize the oil in desired quantities, or additionally where positive control is desired, a suitable heating device may be used. In the disclosure of Fig. 1, a preferred form of heating device is illustrated by a resistance type heater 9 positioned in the oil supply reservoir 4 and deriving its electrical power from any suitable source, including the electrical apparatus or motor which is being lubricated.

Fig. 2 illustrates one acceptable form of a reservoir 10, for the lubricant, which is primarily concerned with the possible combinations of positions the apparatus may take in operative location, or in packing and shipping. In Fig. 2, the reservoir 10 is chosen of a volume capacity substantially greater than the volume of lubricant necessary, and a feed conduit 11 projects into the reservoir 10 to deliver vapor to conduits 7 and 8. The various dimensions are quite readily derived to provide lubricant level and length of feed conduit such that when the reservoir is rotated to varying degrees including 180 degrees, little if any lubricant is lost through feed conduit 11.

The lubrication of bearings is closely dependent on the contemplated load, the higher the load the more definite the supply and quantity of lubricant necessary. Therefore, a lightly loaded bearing employing the lubrication system of this invention provides a substantially long-life lubricated bearing. One method of decreasing the load on bearings including lightly loaded bearings for fans, etc. is to mount the motor in a vertical position, as shown in Fig. 3. In Fig. 3 there is shown a motor driven fan 12 comprising a stator 13 and a rotor 14 which is shaft-mounted by means of shaft 15 for rotation in bearings 16 and 17. Shaft 15 extends through upper bearing 16 and has attached thereto a suitable fan element 18. The reduction in bearing loading is attained by employing the fan 18 to direct air downwardly over the motor 12, thus generating some degree of thrust or lift to lighten the rotor load on lower bearing 17. Very light air circulation fans would, however, provide very little lift. Therefore, a more positive arrangement includes positioning the magnetic field of the rotor and the magnetic field of the stator slightly spaced vertically from each other so that, upon rotation of the motor, the magnetic field of the stator attempts to exert an upward pull on the rotor to coincide their particular fields. A flexible diaphragm 19 between the shaft 15 and fan 18 prevents fan couple forces from being transmitted to the shaft and thence to the bearings. In this arrangement the lower bearing 17 is a thrust bearing and is partly submerged in oil 20 of the reservoir 21. To provide lubrication for the upper bearing 16, a conduit 22 leads from the reservoir 21 to bearing 16. In all cases, depending on the condition of the temperatures involved, conduit 22 may be insulated and the bearing 16 have extraneous cooling devices such as fins, and the like, thereon.

While the physical arrangement may vary to suit a particular requirement, the arrangement illustrated in Fig. 3 is a preferred form where the lower bearing 17 is of the porous type and partly submerged. Lower bearing 17 derives its lubrication initially in a positive manner and when the lubricant level falls below bearing 17 it continues to derive lubricant by the vapor or mist method. Conduit 22 is directed externally of the motor 12 along stator 13 and contains a bend or curve 23 of greater than 90° in order to provide direct cooling from fan 18. The condensation as a result of this cooling may then with the aid of gravity, flow to upper bearing 16. As in Fig. 1, where desirable, a suitable resistance type heater 9 may be employed in reservoir 21.

The lubrication system of this invention may be applied to a small, low-cost fan motor with a contemplated twenty-year or more life span when operating half-time without the necessity for frequent replenishing of the lubricant. The inspection and replenishing feature may be eliminated entirely if desirable. Such a motor includes bearings which may be effectively lubricated with an oil feed of approximately 1/10 gram per 1,000 hours of operation, or one cubic centimeter per year. It is, of course, important that the oil be chosen of the type which will not only vaporize sufficiently at the predetermined temperature, but which contains no fractions which vaporize at different temperatures. A fractional oil would provide lubricant only until the fraction vaporized at the predetermined temperature is exhausted, and there may thus remain in the reservoir a proportionately large supply of lubricant which will not be vaporized to serve as a lubricant.

An example of this invention employed spindle oil in a reservoir maintained at approximately 90° C. The vapor tubes were not insulated, and the extreme portions were cooler than the portions adjacent the reservoir. It was noted that these cooler portions aided considerably in the condensation of oil vapor. Through a low power microscope it was observed quite readily that the oil particles would strike and essentially disappear on a given surface. This effect may be increased by installing a rotating disc in the bearing housing and forcing vapor against the surfaces, to thereby recover much vapor or mist which may remain in suspension.

This invention further contemplates adaptability as a transport-type of lubrication system as disclosed in Fig. 4. In Fig. 4, 24 represents a central reservoir having a form of heating means such as an electrical resistance 9 positioned therein. A main conduit 25 leads from the reservoir to a system of conduit 26, which individually transport a lubricant vapor to remote areas requiring lubrication where the vapor may then be condensed by contact with cooler surfaces such as the surface requiring lubrication, or by exposing parts of the conduits 26 or the vapor therein to cooling mediums. Where it is necessary to transport such a vapor over extensive distances, a fan 27 or other suitable blowing means may be employed with the reservoir to move air across the surface of the lubricant and into the piping system under pressure. The invention thus discloses a use of this system for metering a lubricant, for lubricating remotely to different areas, and for attaining lubricant time control. Diverse adaptabilities are suggested since the heat source could be independent and controllable and the kind and amount of the lubricant varied to suit the particular application.

While I have shown and described specific embodiments of my invention, I do not desire this invention to be limited to the particular constructions shown and described, as it is intended by the appended claims to cover all modifications within the spirit and scope of this invention.

What I claim as new and desire to secure by Letters Patent of the United States is:

1. An electric motor comprising in combination, a stator, a rotor, a porous sleeve bearing for said rotor, and a lubrication system for said bearing comprising, an oil reservoir positioned adjacent said stator and in contact therewith to derive heat therefrom, a supply of oil in said reservoir, said lubricant being free from any vaporizing fraction which will vaporize below a predetermined temperature necessary to supply a lubricant vapor, said oil being vaporized at a predetermined temperature less than the operating temperature of the motor, an external conduit leading from said reservoir to said bearing to transport oil vapor to said porous bearing, and means to condense said vapor at said bearing.

2. A long-life lubrication system for vertically mounted fan motors which comprises in combination, a stator, a rotor positioned within said stator such that its magnetic field is below that of said stator, an upper and a lower porous bearing for said rotor, and a lubrication system for said bearings including, a reservoir adjacent said lower bearing, a lubricant in said reservoir and initially in contact with said lower bearing, said lubricant being free from any fraction which will vaporize below a predetermined temperature necessary to supply a lubricant vapor, a fan connected to said rotor for rotation thereby to provide an upward force on said rotor, said reservoir being positioned out of the air stream of said fan and adapted to derive heat from said motor, additional electrical resistance heating means in said reservoir and electrically connected to said fan motor as a source of power to vaporize said oil, and a conduit connecting said reservoir to said upper bearing to convey oil vapor thereto, said conduit being exposed in part to the air stream from said fan for cooling purposes.

3. An electric motor including in combination, a porous bearing requiring lubrication, and a lubrication system therefor comprising in combination, a lubricant reservoir adjacent the stator of said motor to derive heat therefrom, a lubricant in said reservoir, an external conduit connected to said bearing and said reservoir, said conduit extending into said reservoir a distance less than the level of lubricant therein, electrical heating means connected to said motor winding to derive power therefrom to vaporize the lubricant in said reservoir, and means to condense the vapor in said conduit for liquid lubrication of said bearing.

References Cited in the file of this patent

UNITED STATES PATENTS

| | | |
|---|---|---|
| 457,902 | Kintner | Aug. 18, 1891 |
| 1,598,393 | Robertson | Aug. 31, 1926 |
| 1,610,726 | Arutunoff | Dec. 14, 1926 |
| 2,335,225 | Atlee | Nov. 30, 1943 |
| 2,413,285 | Bousky | Dec. 31, 1946 |
| 2,442,202 | Hughes-Caley | May 25, 1948 |
| 2,502,830 | Crise | Apr. 4, 1950 |
| 2,841,244 | Sorem | July 1, 1958 |

FOREIGN PATENTS

| | | |
|---|---|---|
| 674,257 | France | Oct. 21, 1929 |